(12) United States Patent
Chiba et al.

(10) Patent No.: US 9,214,870 B2
(45) Date of Patent: Dec. 15, 2015

(54) SYNCHRONOUS RECTIFIER CIRCUIT

(71) Applicant: SANKEN ELECTRIC CO., LTD., Niiza-shi, Saitama (JP)

(72) Inventors: Akiteru Chiba, Niiza (JP); Keita Ishikura, Niiza (JP)

(73) Assignee: SANKEN ELECTRIC CO., LTD., Niza-Shi, Saitama (JP)

( * ) Notice: Subject to any disclaimer, the term of this patent is extended or adjusted under 35 U.S.C. 154(b) by 61 days.

(21) Appl. No.: 14/034,132

(22) Filed: Sep. 23, 2013

(65) Prior Publication Data

US 2014/0119061 A1    May 1, 2014

(30) Foreign Application Priority Data

Oct. 29, 2012   (JP) ................................. 2012-237829

(51) Int. Cl.
 *H02M 3/335*    (2006.01)

(52) U.S. Cl.
 CPC ........ H02M 3/33592 (2013.01); *Y02B 70/1475* (2013.01)

(58) Field of Classification Search
 CPC .............. H02M 3/33576; H02M 3/33592; H02M 3/335; Y02B 70/1475
 USPC .............. 363/17, 21.02, 21.03, 21.04, 21.06, 363/21.12, 21.14, 37, 39, 44, 56.05, 65, 89
 See application file for complete search history.

(56) References Cited

U.S. PATENT DOCUMENTS

| | | | | |
|---|---|---|---|---|
| 4,716,514 A | * | 12/1987 | Patel | 363/127 |
| 7,030,596 B1 | * | 4/2006 | Salerno et al. | 323/282 |
| 7,352,160 B2 | * | 4/2008 | Shimizu et al. | 323/282 |
| 8,040,696 B2 | * | 10/2011 | Wu et al. | 363/21.02 |
| 8,089,784 B2 | * | 1/2012 | Choi | 363/25 |
| 2003/0185022 A1 | * | 10/2003 | Ohishi | 363/21.06 |
| 2010/0290256 A1 | * | 11/2010 | Zhou et al. | 363/21.02 |
| 2012/0063175 A1 | * | 3/2012 | Wang et al. | 363/21.14 |

FOREIGN PATENT DOCUMENTS

JP    2001-292571 A    10/2001

* cited by examiner

*Primary Examiner* — Rajnikant Patel
(74) *Attorney, Agent, or Firm* — Birch, Stewart, Kolasch & Birch, LLP (57) ABSTRACT

Provided is a synchronous rectifier circuit which, even if a synchronous rectification element having a low on-resistance is used, can perform a synchronous rectifying operation without being influenced by the inductance component. It is a synchronous rectifier circuit having a synchronous rectification element $Q_{SR}1$ and a synchronous rectification control circuit IC1 for turning on/off the synchronous rectification element $Q_{SR}1$ in accordance with the current $i_{SR}$ flowing through the synchronous rectification element $Q_{SR}1$, including a current detection circuit for detecting the current $i_{SR}$ flowing through the synchronous rectification element $Q_{SR}1$ during an on-period of the synchronous rectification element $Q_{SR}1$ as a synchronized voltage waveform, the synchronous rectification control circuit IC1 being configured so as to turn off the synchronous rectification element $Q_{SR}1$ on the basis of the voltage waveform detected by the current detection circuit 1a.

6 Claims, 13 Drawing Sheets

$i_{SR}$ $V_{Zds\_on}$

SECONDARY SIDE VOLTAGE OF Tr

VOLTAGE Vc

Vdet    $V_{TH1}$
        $V_{TH2}$

VGATE

SWa

SWb t1  t2   t3        t4   t5

SYNCHRONOUS RECTIFIER CIRCUIT

BACKGROUND OF THE INVENTION

1. Field of the Invention

The present invention relates to a synchronous rectifier circuit for use with a switching power supply, such as a serial resonance converter, or the like.

2. Description of the Related Art

Figure 7:
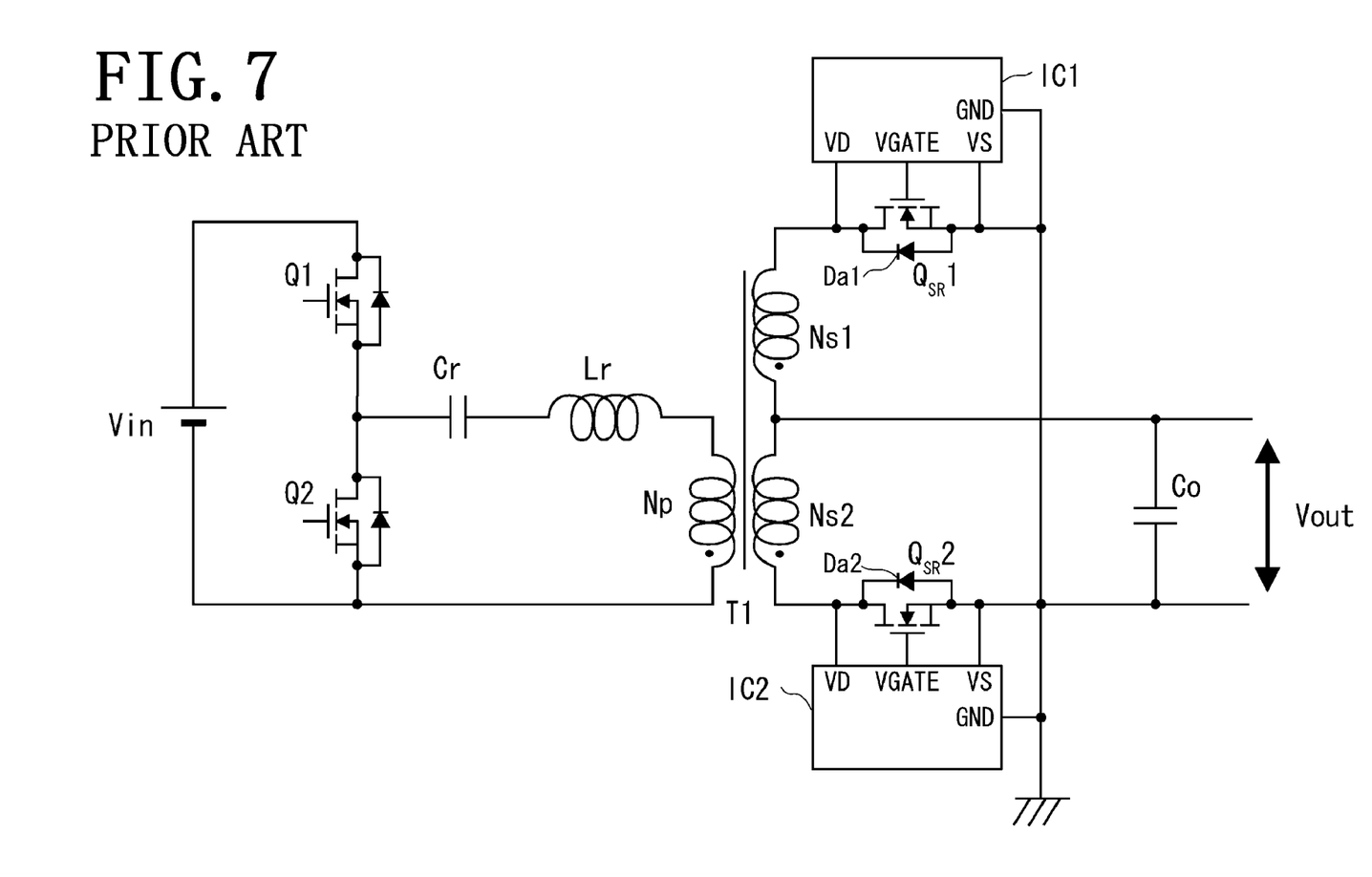
FIG. 7 is a circuit configuration diagram illustrating a circuit configuration of a conventional serial resonance converter.

A synchronous rectifier circuit is known which uses a synchronous rectification element, such as an MOSFET, or the like, for synchronously rectifying a secondary side wiring current of a switching power supply device, such as a serial resonance converter, or the like (for example, refer to Patent Document 1). In FIG. 7, as an example of switching power supply device using such a synchronous rectifier circuit, a serial resonance converter is shown.

The serial resonance converter shown in FIG. 7 includes a transformer T1; switch elements Q1 and Q2; a resonance capacitor Cr; a resonance reactor Lr; synchronous rectification elements $Q_{SR}1$ and $Q_{SR}2$; synchronous rectification control circuits IC1 and IC2; and an output capacitor Co.

To the primary side circuit of the transformer T1, the switch elements Q1 and Q2 are connected, and by alternately turning-on the switch elements Q1 and Q2, a voltage of a square wave is applied to a serial resonance circuit composed of the resonance capacitor Cr, the resonance reactor Lr, and the excitation inductance Np of the transformer T1.

The secondary side rectification circuit is a synchronous rectifier circuit which is composed of the synchronous rectification elements $Q_{SR}1$ and $Q_{SR}2$ and the synchronous rectification control circuits IC1 and IC2. The synchronous rectification elements $Q_{SR}1$ and $Q_{SR}2$ are insulated-gate field-effect transistors (FET), being connected across the secondary wiring Ns1, Ns2 and the negative polarity side terminal (GND) of the output capacitor Co of the transformer T1, respectively. The synchronous rectification elements $Q_{SR}1$ and $Q_{SR}22$ may be of another type of semiconductor switch, such as a bipolar transistor, an IGBT, or the like. Further, reference symbols Da1 and Da2 denote diodes which are connected in parallel with the synchronous rectification elements $Q_{SR}1$ are $Q_{SR}2$ respectively, being parasitic diodes in the synchronous rectification elements $Q_{SR}1$ and $Q_{SR}2$ composed of an FET, respectively. These diodes Da1 and Da2 may be individual diodes which are configured separately from the synchronous rectification elements $Q_{SR}1$ and $Q_{SR}2$.

Figure 8:
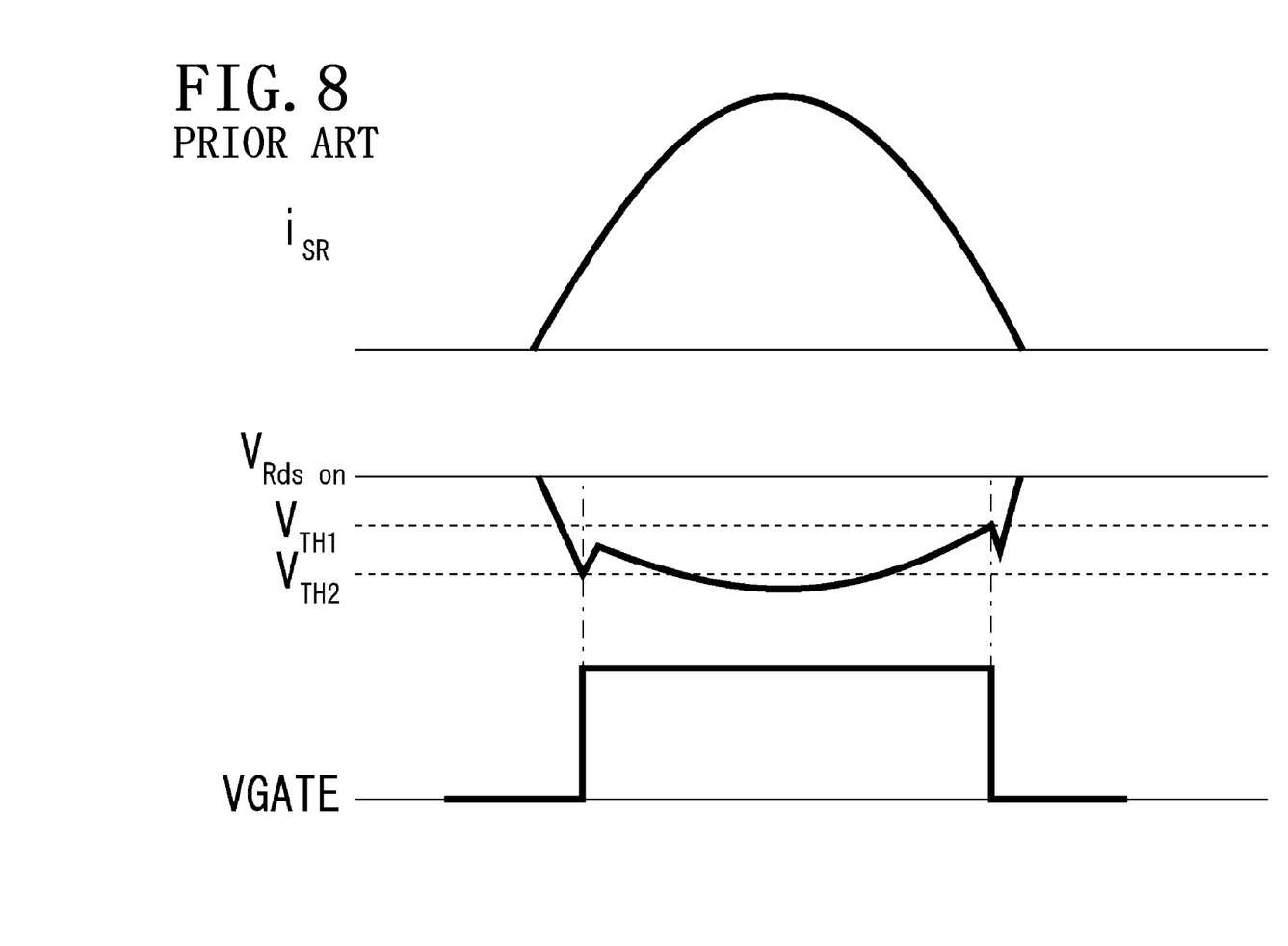
FIG. 8 is a signal waveform diagram for explaining the operation of the synchronous rectification control circuit shown in FIG. 7.

The synchronous rectification control circuit IC1 has a differential voltage detection function, and as shown in FIG. 8, detects the current $i_{SR}$ flowing through the synchronous rectification element $Q_{SR}1$ as the drain-source voltage (VD-VS) of the synchronous rectification element $Q_{SR}1$ for performing gate control. In other words, the synchronous rectification control circuit IC1 monitors the saturation voltage $VR_{ds\_on}$ which is generated when a current $i_{SR}$ flows through the on-resistance $R_{ds\_on}$ upon the synchronous rectification element $Q_{SR}1$ being on. And with the saturation voltage $VR_{ds\_on}$ being compared with the turn-on threshold voltage $V_{TH2}$ and the turn-off threshold voltage $V_{TH1}$, the current $i_{SR}$ flowing through the synchronous rectification element $Q_{SR}1$ is detected, and on the basis thereof, a gate signal (VGATE) is outputted. The synchronous rectification control circuit IC2 has the same configuration as that of the synchronous rectification control circuit IC1.

Patent Document 1: Japanese Unexamined Patent Application Publication No. 2001-292571

Figure 9A:
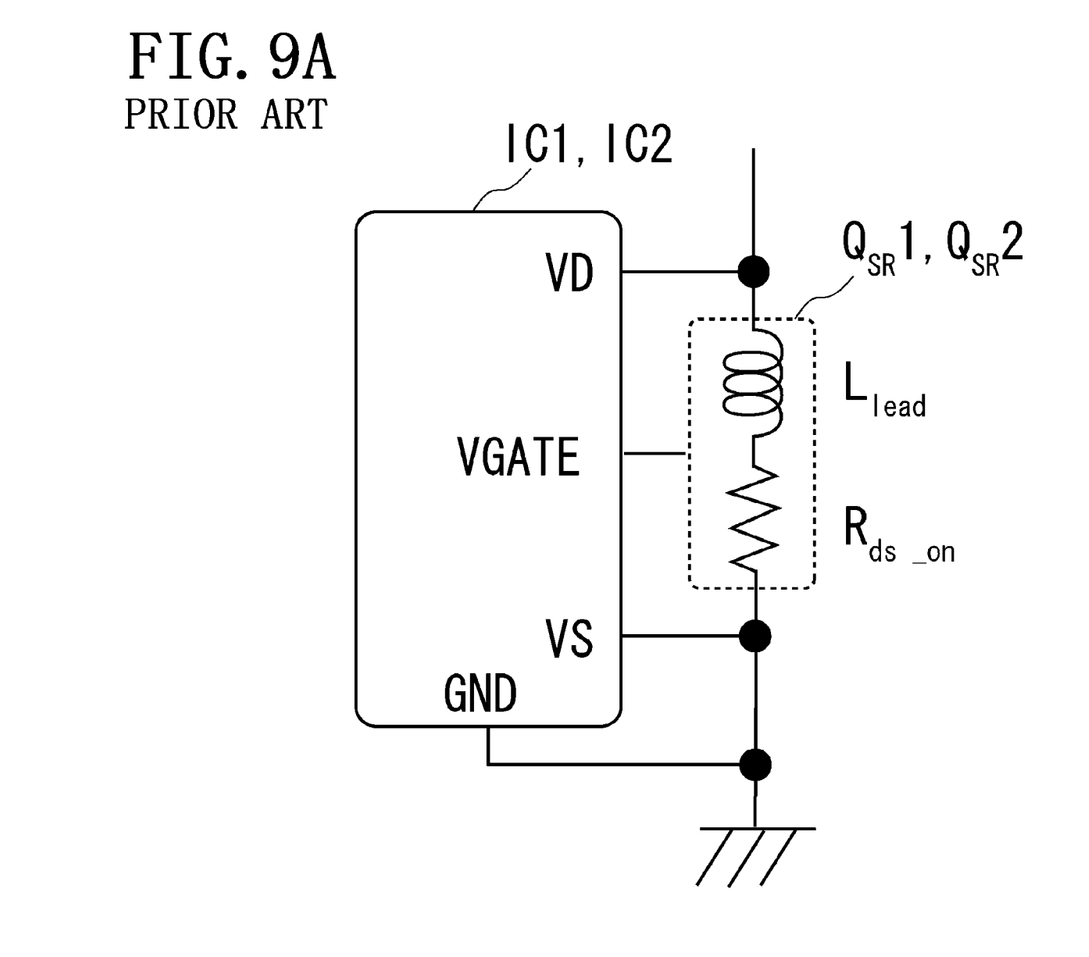
FIG. 9(A) and FIG. 9(B) are explanation diagrams for explaining the impedance of the synchronous rectification element shown in FIG. 7 in consideration of the inductance component.

However, in the case where a synchronous rectification element, the on-resistance of which, in recent years, has been reduced, is used as $Q_{SR}1$, $Q_{SR}2$ for making synchronous rectification, since a resistance component, such as the on-resistance $R_{ds\_on}$, is small, a voltage drop due to the inductance component $L_{lead}$ of a bonding wire, a lead, or the like, can influence the synchronous rectification. FIG. 9(A) shows an equivalent circuit when the synchronous rectification element $Q_{SR}1$, $Q_{SR}2$ is on.

Figure 9B:
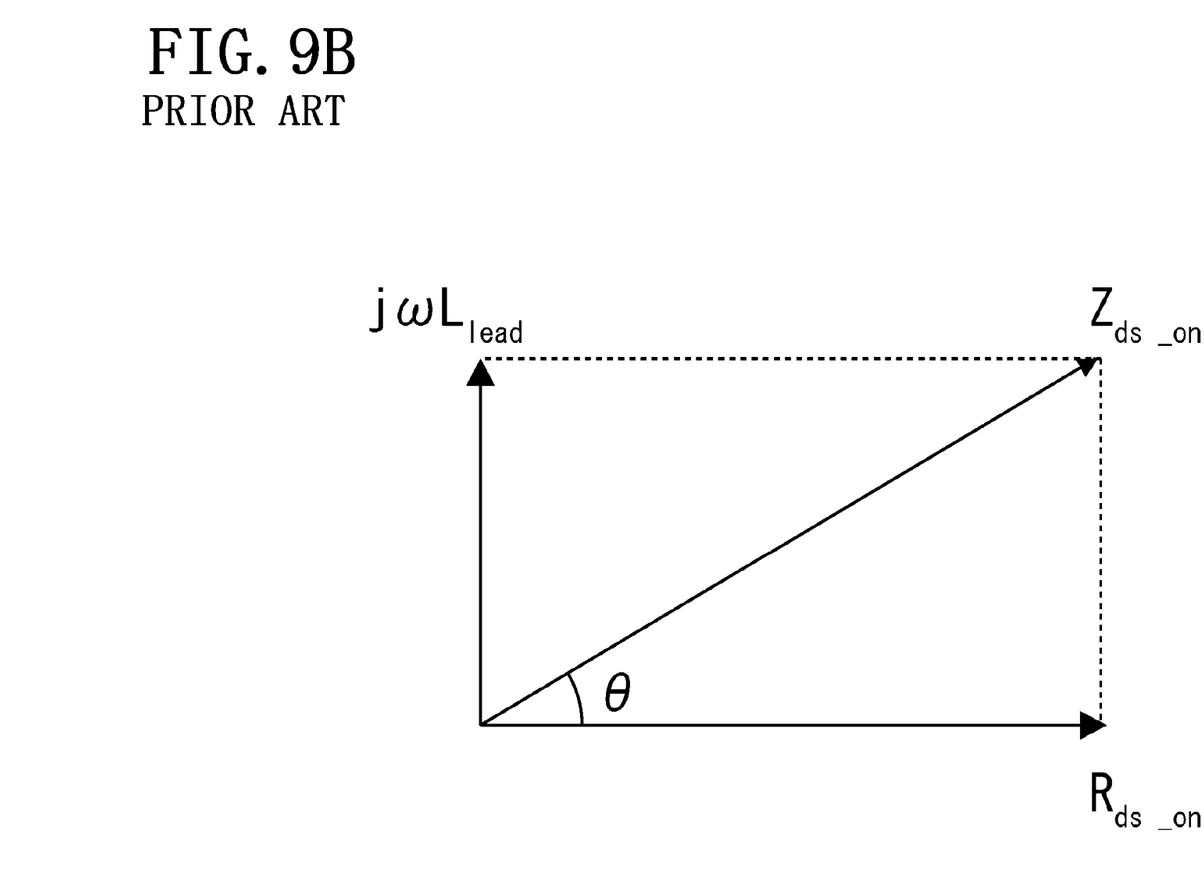

The inductance component $L_{lead}$ changes the impedance $Z_{ds\_on}$ of the synchronous rectification element $Q_{SR}1$, $Q_{SR}2$ into an impedance of advanced phase as shown in FIG. 9(B), which is expressed by the following expression.

$$Z_{ds\_on} = R_{ds\_on} + j\omega Llead \qquad [\text{Math 1}]$$

$$\theta = \arctan\left(\frac{\omega Llead}{R_{ds\_on}}\right)$$

Figure 10:
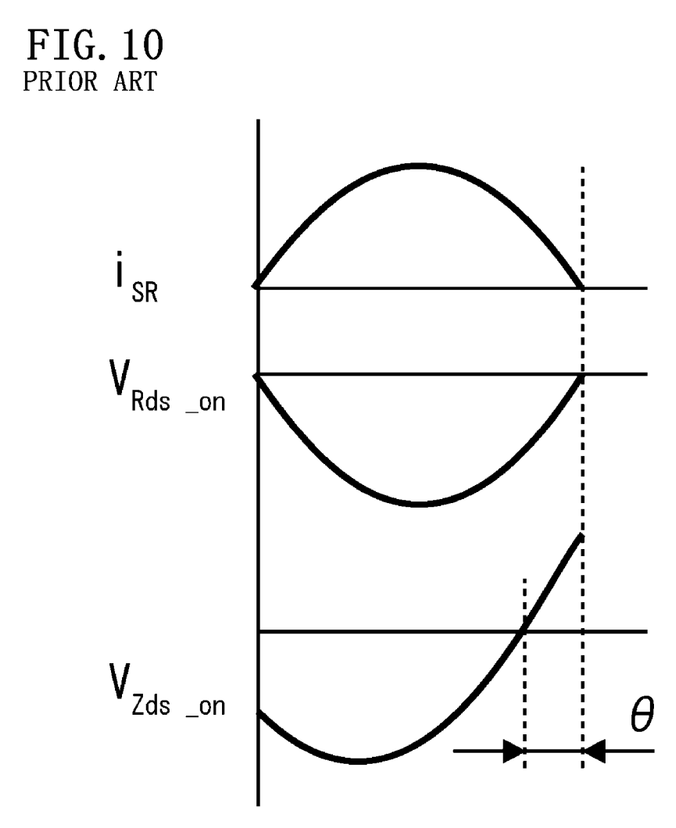
FIG. 10 is a waveform diagram for explaining the change in phase of the saturation voltage due to the inductance component.
Figure 11:
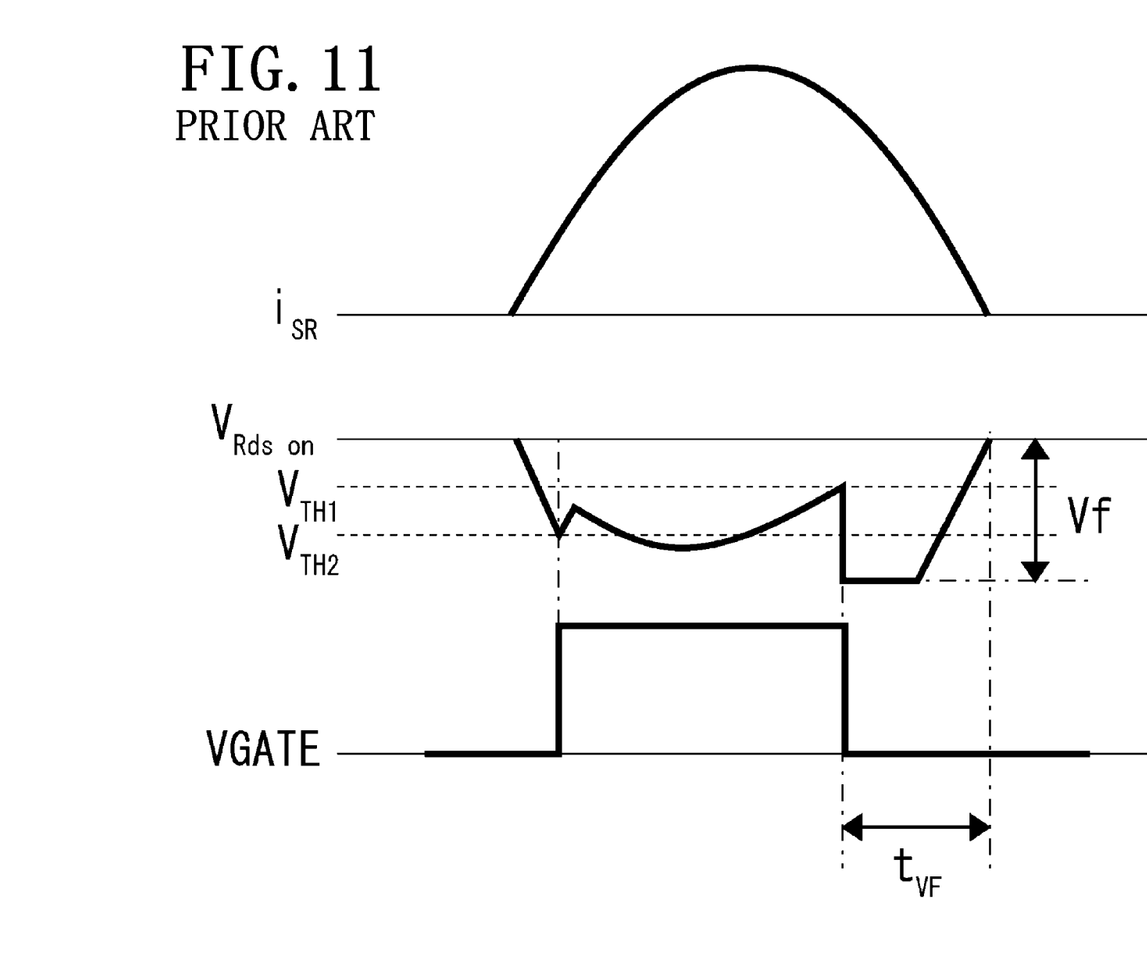
FIG. 11 is a signal waveform diagram for explaining the operation of the synchronous rectification control circuit shown in FIG. 7 in consideration of the inductance component.

FIG. 10 indicates respective voltage drops of $V_{Rds\_on}$ and $V_{Zds\_on}$ generated when the current $i_{SR}$ is caused to flow through the on-resistance $R_{ds\_on}$ and the impedance $Z_{ds\_on}$ which is determined from "Math 1", respectively. From FIG. 10, it can be seen that the phase of $V_{Zds\_on}$ is advanced as compared to that of $V_{Rds\_on}$. Therefore, if the impedance $Z_{ds\_on}$ of the synchronous rectification element $Q_{SR}1$ is used for gate control of the synchronous rectification control circuit IC1, as shown in FIG. 11, the advanced phase of the saturation voltage $V_{Zds\_on}$ causes the $V_{Rds\_on}$ to reach the turn-off threshold voltage $V_{TH1}$ far before the current $i_{SR}$ becoming zero, resulting in the gate signal (VGATE) being turned off.

Therefore, a sufficient gate width cannot be obtained, and the period $t_{VF}$ during which the current flows through the diode D1 for the synchronous rectification element $Q_{SR}1$ is increased, thereby it is difficult to enhance the converter efficiency. Reference symbol Vf denotes a forward voltage across the diode D1.

From now on, it can be expected that the on-resistance of the synchronous rectification element $Q_{SR}1$, $Q_{SR}2$ will be further reduced, or by parallel connection of these synchronous rectification elements $Q_{SR}1$ and $Q_{SR}2$, the saturation voltage $V_{Rds\_on}$ will be increasingly decreased. For example, with the FETs in recent years, the on-resistance $R_{ds\_on}$ is as low as several milliohms, and the inductance component $L_{lead}$ is as small as several nanohenries, the saturation voltage $V_{Zds\_on}$ being also as low as several millivolts to dozen millivolts or so, thereby they have presented a problem of being embedded in the noise, or the like, resulting in easily malfunctioning to be unserviceable. In addition, there has been a problem that, if the reduction in on-resistance causes the inductance component $L_{lead}$ to be further actualized to provide a more advanced phase impedance, as shown in FIG. 11, it will become impossible to obtain a sufficient gate width, and expect the advantage of the synchronous rectification.

The present invention has been made in view of the above problems of the prior art, and it is an object of the present invention to solve such problems by providing a synchronous rectifier circuit which, even if a synchronous rectification element having a low on-resistance is used, a synchronous rectifying operation can be performed, being not influenced by the inductance component.

SUMMARY OF THE INVENTION

The synchronous rectifier circuit of the present invention is a synchronous rectifier circuit having a synchronous rectification element, and a synchronous rectification control circuit for turning on/off said synchronous rectification element according to the current flowing through the synchronous rectification element, including a current detection circuit for detecting the current flowing through said synchronous rectification element during an on-period of said synchronous rectification element as a synchronized voltage waveform, said synchronous rectification control circuit turning off said synchronous rectification element on the basis of said voltage waveform detected by said current detection circuit.

Further, the synchronous rectifier circuit of the present invention may be adapted such that said synchronous rectification control circuit turns on said synchronous rectification element according to the saturation voltage of said synchronous rectification element, while turning off said synchronous rectification element according to said saturation voltage of said synchronous rectification element and said voltage waveform detected by said current detection circuit.

Further, the synchronous rectifier circuit of the present invention may be adapted such that said current detection circuit includes a transformer having a primary side wiring connected in parallel with said synchronous rectification element, and a phase adjustment capacitor connected across the secondary side wiring of the transformer, said phase adjustment capacitor phase-adjusting the voltage across said phase adjustment capacitor to be in phase with the current flowing through said synchronous rectification element.

Further, the synchronous rectifier circuit of the present invention may be adapted such that the series circuit of the phase adjustment resistor and said phase adjustment capacitor is connected across the secondary side wiring of said transformer.

Further, the synchronous rectifier circuit of the present invention may be adapted such that, assuming that the resistance value of said phase adjustment resistor is R; the capacitance of said phase adjustment capacitor is C; the on-resistance of said synchronous rectification element is $R_{ds\_on}$; and the inductance component of said synchronous rectification element is $L_{lead}$, respectively, said phase adjustment resistor and said phase adjustment capacitor are set to satisfy a relation of $RC = L_{lead}/R_{ds\_on}$.

Further, the synchronous rectifier circuit of the present invention may be adapted such that said current detection circuit includes a first switch element connected across said synchronous rectification element and said primary side wiring, and turned on/off in synchronization with said synchronous rectification element.

Further, the synchronous rectifier circuit of the present invention may be adapted such that said current detection circuit includes a second switch element connected in parallel with said phase adjustment capacitor for resetting said phase adjustment capacitor, upon said synchronous rectification element being turned off.

In accordance with the present invention, even if the inductance component is actualized to provide an advanced phase impedance, a sufficient gate width can be ensured, and even if a synchronous rectification element having a low on-resistance is used, a precise synchronous rectifying operation can be performed, being not influenced by the inductance component.

DETAILED DESCRIPTION OF THE PREFERRED EMBODIMENT

Next, an embodiment of the present invention will be specifically explained with reference to the drawings.

Figure 1:
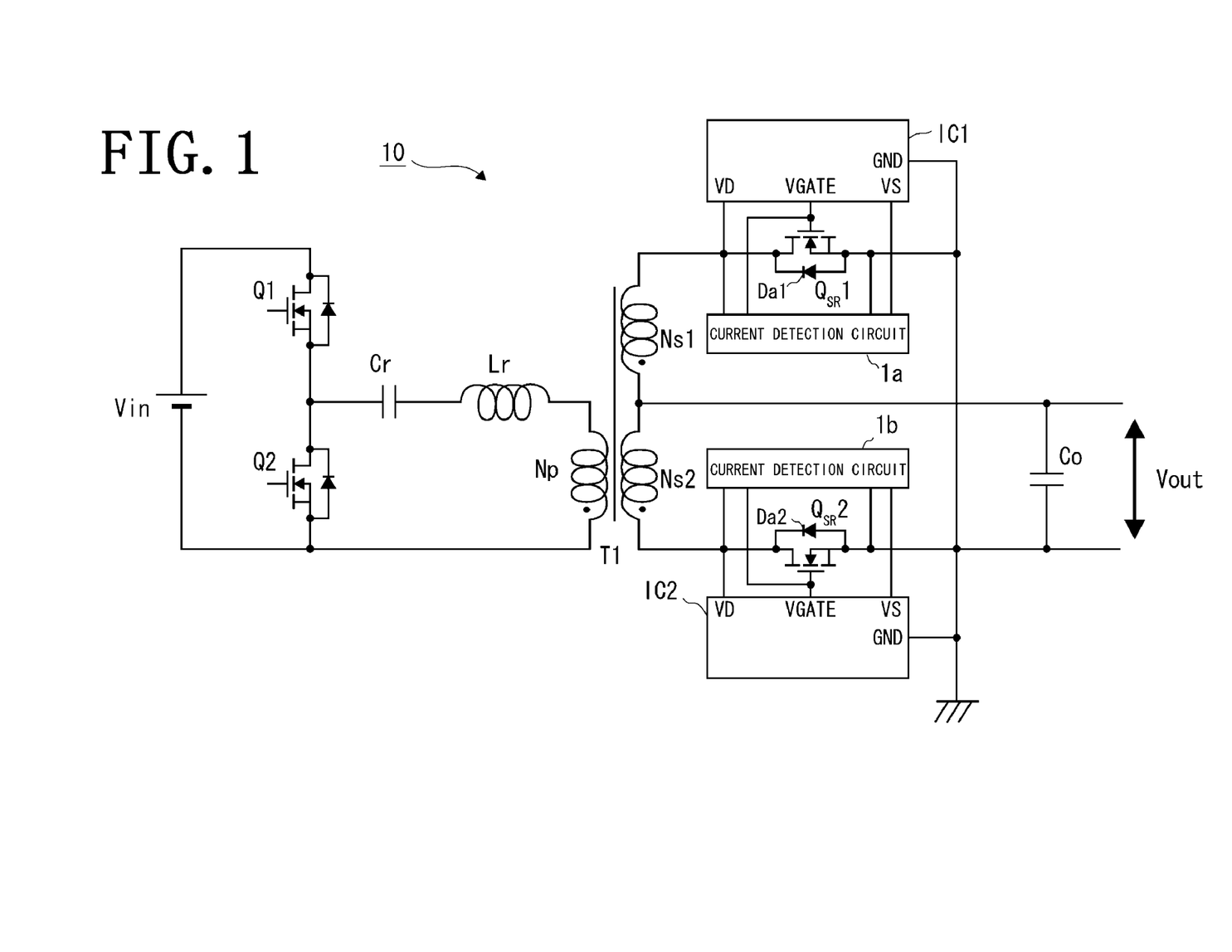
FIG. 1 is a circuit configuration diagram illustrating a circuit configuration of a serial resonance converter including an embodiment of a synchronous rectifier circuit in accordance with the present invention.

As shown in FIG. 1, a serial resonance converter having a synchronous rectifier circuit of the present embodiment includes a transformer T1; switch elements Q1 and Q2; a resonance capacitor Cr; a resonance reactor Lr; synchronous rectification elements $Q_{SR}1$ and $Q_{SR}2$; current detection circuits 1a and 1b; synchronous rectification control circuits IC1 and IC2; and an output capacitor Co.

To the primary side circuit of the transformer T1, the switch elements Q1 and Q2 are connected, and by alternately turning-on the switch elements Q1 and Q2, a voltage of a square wave is applied to a serial resonance circuit which is composed of the resonance capacitor Cr, the resonance reactor Lr, and the excitation inductance Np of the transformer T1.

The secondary side rectification circuit is the synchronous rectifier circuit which is composed of the synchronous rectification elements $Q_{SR}1$ and $Q_{SR}2$ the current detection circuits 1a and 1b, and the synchronous rectification control circuits IC1 and IC2. The synchronous rectification elements $Q_{SR}1$ and $Q_{SR}2$ are insulated-gate field-effect transistors (FET), being connected across the secondary wiring Ns1, Ns2 and the negative polarity side terminal (GND) of the output capacitor Co of the transformer T1, respectively. The synchronous rectification elements $Q_{SR}1$ and $Q_{SR}2$ may be of another type of semiconductor switch, such as a bipolar transistor, an IGBT, or the like. Further, reference symbols Da1 and Da2 denote diodes which are connected in parallel with the synchronous rectification elements $Q_{SR}1$ are $Q_{SR}2$ respectively, being parasitic diodes in the synchronous rectification elements $Q_{SR}1$ and $Q_{SR}2$ composed of an FET, respectively.

These diodes Da1 and Da2 may be individual diodes which are configured separately from the synchronous rectification elements $Q_{SR}1$ and $Q_{SR}2$.

Figure 2:
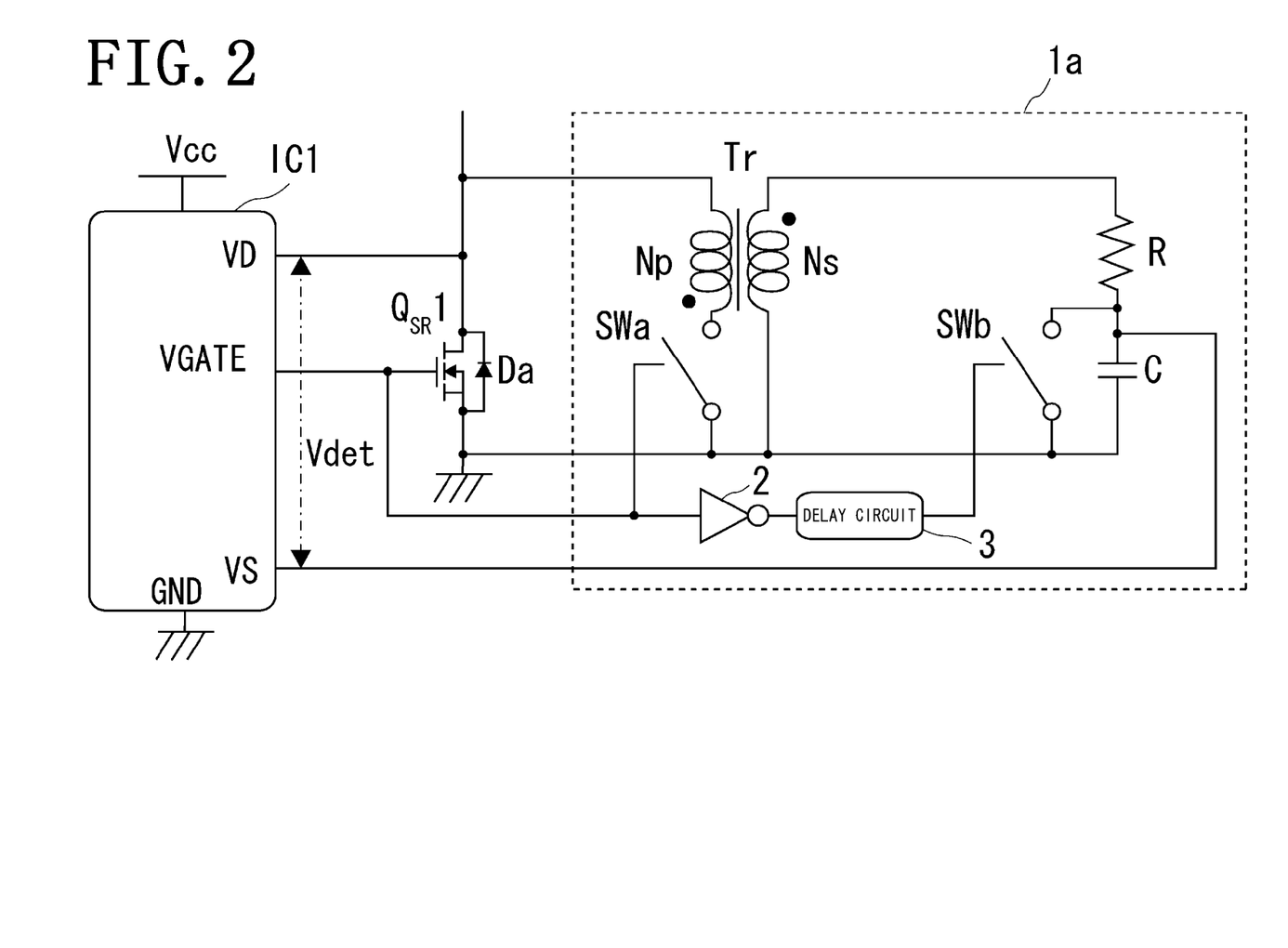
FIG. 2 is a circuit configuration diagram illustrating a circuit configuration of a current detection circuit shown in FIG. 1.

As shown in FIG. 2, the current detection circuit 1a includes a transformer Tr; a phase adjustment resistor R; a phase adjustment capacitor C; switch elements SWa and SWb; an inversion circuit 2; and a delay circuit 3.

The transformer Tr is composed of the primary wiring Np and secondary wiring Ns which are opposite to each other in polarity, the number of turns of the secondary wiring Ns being set to be larger than that of the primary wiring Np. One end of the primary wiring Np is connected to the drain of the synchronous rectification element $Q_{SR}1$, while the other end of the primary wiring Np is connected to the source of the synchronous rectification element $Q_{SR}1$ through the switch element SWa. In other words, a series circuit of the primary wiring Np and the switch element SWa is connected in parallel with the synchronous rectification element $Q_{SR}1$. In addition, across the secondary wiring Ns, a series circuit of the phase adjustment resistor R and the phase adjustment capacitor C is connected, with the switch element SWb being connected in parallel with the phase adjustment capacitor C.

As the switch element SWa and the switch element SWb, a semiconductor switch, such as an FET, a bipolar transistor, an IGBT, or the like, may be used. The switch element SWa is on/off-controlled by a gate signal (VGATE) of the synchronous rectification element $Q_{SR}1$, while the switch element SWb is on/off-controlled by a gate signal (VGATE) of the synchronous rectification element $Q_{SR}1$ that has been inverted and delayed by an inversion circuit 2 and a delay circuit 3. The current detection circuit 1b has the same configuration as that of the current detection circuit 1a.

The synchronous rectification control circuit IC1 has a differential voltage detection function, and detects a differential voltage Vdet between the drain voltage (saturation voltage $V_{Zds\_on}$) of the synchronous rectification element $Q_{SR}1$ and the voltage Vc across the phase adjustment capacitor C for performing gate control.

In other words, the synchronous rectification control circuit IC1 monitors a differential voltage Vdet between the saturation voltage $V_{Zds\_on}$ which is generated when a current $i_{SR}$ flows through the synchronous rectification element $Q_{SR}1$, and the voltage Vc across the phase adjustment capacitor C. With the differential voltage Vdet being compared with the turn-on threshold voltage $V_{TH2}$ and the turn-off threshold voltage $V_{TH1}$, a current $i_{SR}$ flowing through the synchronous rectification element $Q_{SR}1$ is detected, and on the basis thereof, a gate signal (VGATE) is outputted. The synchronous rectification control circuit IC2 has the same configuration as that of the synchronous rectification control circuit IC1.

The saturation voltage $V_{Zds\_on}$ of the synchronous rectification element $Q_{SR}1$ that is generated by the flowing current $i_{SR}$ is amplified by the transformer Tr in the current detection circuit 1a to be transformed into a large signal which is not susceptible to noise, and the like, and can be easily detected. Here, the phase of the saturation voltage $V_{Zds\_on}$ is advanced, however, the series circuit of the phase adjustment resistor R and the phase adjustment capacitor C corrects the current $i_{SR}$ and the voltage Vc across the phase adjustment capacitor C so as to be in phase with each other. In other words, the voltage Vc across the phase adjustment capacitor C can be handled as a large signal as a result of amplifying the voltage drop $V_{Rds\_on}$ generated across the on-resistor $R_{ds\_on}$ of the synchronous rectification element $Q_{SR}1$ with the transformer Tr, rather than as the voltage drop (saturation voltage $V_{Zds\_on}$), which involves an influence of the inductance component $L_{lead}$ of the synchronous rectification element $Q_{SR}1$. Therefore, the voltage Vc across the phase adjustment capacitor C becomes dominant over the saturation voltage $V_{Zds\_on}$, which comes to the same thing as that the synchronous rectification control circuit IC1 monitors the current $i_{SR}$.

Figure 3:
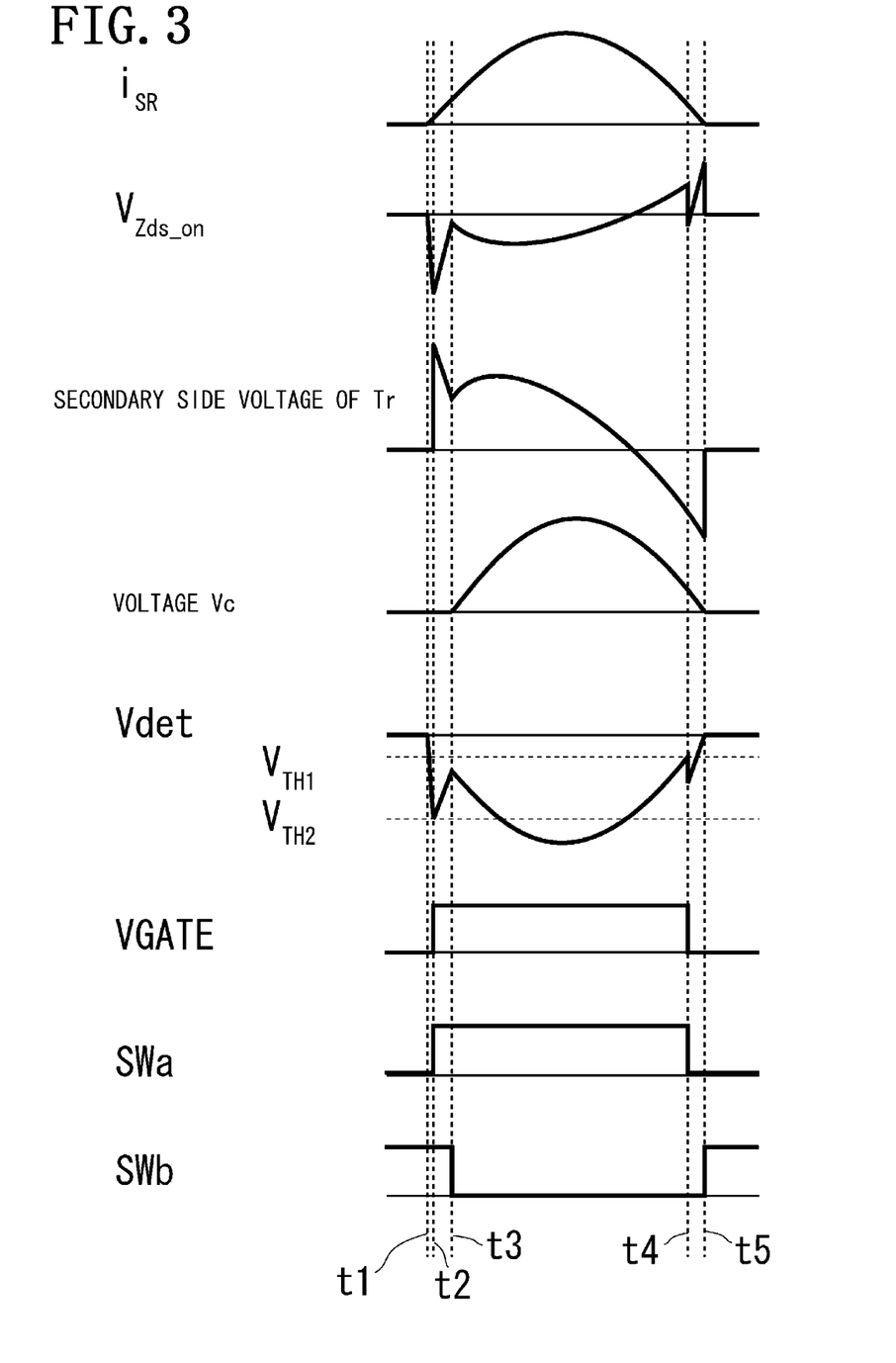
FIG. 3 is a waveform diagram showing signal waveforms and operation waveforms of respective components in FIG. 2.

As shown in FIG. 3, at time t1, the current $i_{SR}$ begins to flow. At this time, the synchronous rectification element $Q_{SR}1$ is not yet turned on, the current flowing through the diode Da. At this time, the switch element SWb is on, and the voltage Vc across the phase adjustment capacitor C is at 0 V. Therefore, the differential voltage Vdet to be compared with the turn-on threshold voltage $V_{TH2}$ is the saturation voltage $V_{Zds\_on}$. With the current flowing through the diode Da, the forward voltage of the diode Da is increased, and when, at time t2, the differential voltage Vdet (saturation voltage $V_{Zds\_on}$) reaches the turn-on threshold $V_{TH2}$, the synchronous rectification control circuit IC1 outputs a gate signal (VGATE).

When, at time t2, the gate signal (VGATE) is outputted, the synchronous rectification element $Q_{SR}1$ is shifted from an off-state to an on-state. The period from time t2 to time t3 is a switching time period for the synchronous rectification element $Q_{SR}1$. In addition, the gate signal (VGATE) simultaneously turns the switch element SWa on, and at this time, the voltage, which has transited from the forward voltage of the diode Da to the on-voltage $V_{Zds\_on}$ of the synchronous rectification element $Q_{SR}1$, is applied to the primary side of the transformer Tr, a secondary side voltage which has been amplified according to the wiring ratio Ns/Np being outputted from the secondary side of the transformer Tr.

At time t3, the synchronous rectification element $Q_{SR}1$ is fully turned on, and at this timing, the switch element SWb is turned off, the phase adjustment capacitor C beginning to function. In other words, the delay circuit 3 sets the delay time at a time period from the moment when the synchronous rectification element $Q_{SR}1$ is turned on by the inverted gate signal (VGATE) until the moment when it is fully turned on (i.e., that from time t2 to time t3).

The saturation voltage $V_{Zds\_on}$ is an advanced phase voltage, and the secondary side voltage which has been amplified by the transformer Tr is also an advanced phase voltage. Therefore, with the series circuit of the phase adjustment resistor R and the phase adjustment capacitor C, the phase of the secondary side voltage is delayed to generate a voltage Vc across the phase adjustment capacitor C that is in phase with the current $i_{SR}$ flowing through the synchronous rectification element $Q_{SR}1$. The setting of the phase adjustment resistor R and the phase adjustment capacitor C in order to generate the voltage Vc across the phase adjustment capacitor C that is in phase with the current $i_{SR}$ will be described later.

The synchronous rectification control circuit IC1 continues to monitor the differential voltage Vdet between the drain voltage $V_{Zds\_on}$ of the synchronous rectification element $Q_{SR}1$ and the voltage Vc across the phase adjustment capacitor C. Then, when, at time t4, the differential voltage Vdet reaches the turn-off threshold $V_{TH1}$, the synchronous rectification control circuit IC1 stops outputting the gate signal (VGATE), shifting the synchronous rectification element $Q_{SR}1$ from the on-state to the off-state to terminate the synchronous rectifying operation. At the same time, the switch element SWa is turned-off, and when the delay time, which is set by the delay circuit 3, has elapsed at time t5, the switch element SWb is turned on to be ready for the subsequent synchronous rectifying operation.

Next, the setting of the phase adjustment resistor R and the phase adjustment capacitor C will be explained in detail with reference to FIG. 4(A) and FIG. 4(B).

Figure 4A:
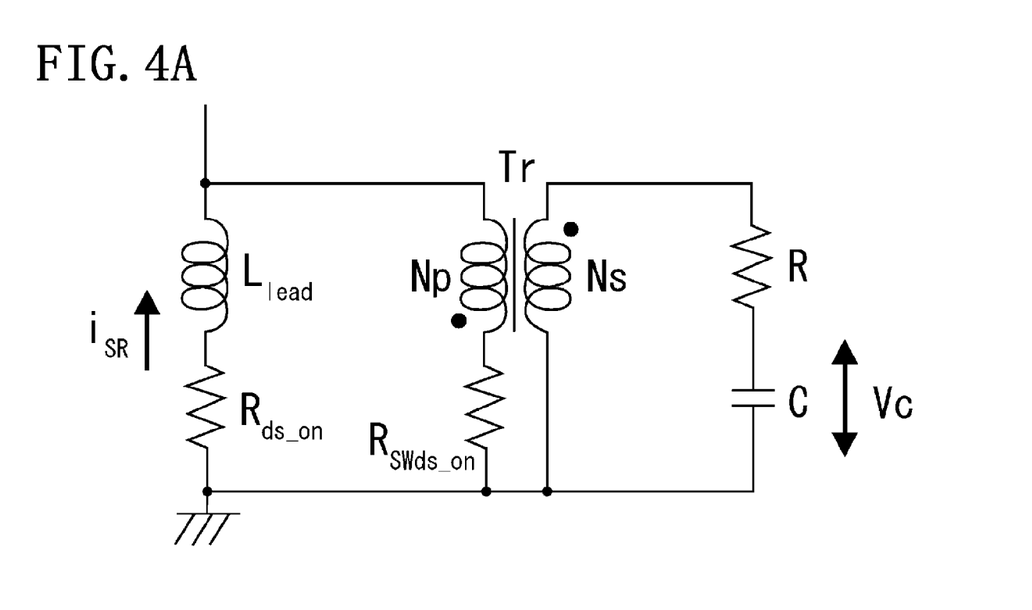
FIG. 4(A) and FIG. 4(B) are equivalent circuit diagrams for the current detection circuit shown in FIG. 2.
Figure 4B:
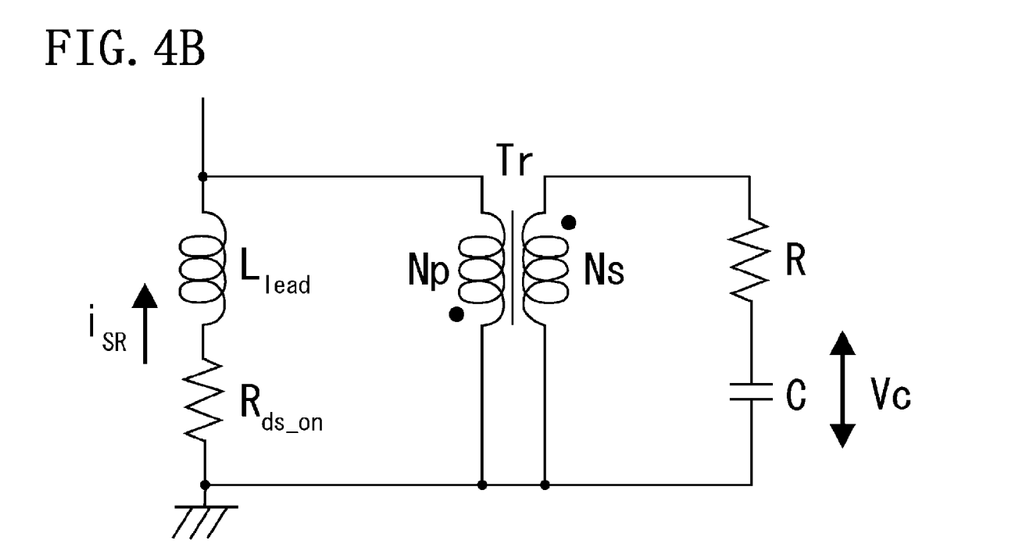

FIG. 4(A) shows an equivalent circuit for the current detection circuit 1a, 1b shown in FIG. 2. Here, considering that, through the switch element SWa and the primary side wiring Np of the transformer Tr, only a small current flows as compared to the current $i_{SR}$, and if, in order to detect the saturation voltage $V_{Zds\_on}$ in more detail, the on-resistance $R_{Swds\_on}$ of the switch element SWa is decreased to a value which is small enough as compared to the ωLp, the equivalent circuit shown in FIG. 4(A) can be regarded as an equivalent circuit with which the on-resistance $R_{Swds\_on}$ of the switch element SWa is omitted, as shown in FIG. 4(B). Reference symbol Lp denotes the primary side excitation inductance of the transformer Tr. Further, assuming that the switching frequency is f, ω is equal to 2πf.

Assuming that the current $i_{SR}$ which flows through the synchronous rectification element $Q_{SR}1$ is $i_{SR}(t)$, and the voltage Vc across the capacitor C is Vc(t), the voltage drop in the closed network on the secondary side can be expressed by the following expression "Math 2".

$$Vc(t) + RC\frac{dVc(t)}{dt} = \frac{Ns}{Np}\left\{R_{ds\_on} \cdot i_{SR}(t) + L_{lead}\frac{di_{SR}(t)}{dt}\right\} \quad [\text{Math 2}]$$

Taking the laplace transform we have: $\mathcal{L}[Vc(t)] = Vc(s)$ $$\mathcal{L}[i_{SR}(t)] = 1_{SR}(s)$$

$$VC(s) + RC\{sVc(s) - Vc(t=0)\} =$$

$$\frac{Ns}{Np}[R_{ds\_on} \cdot 1_{SR}(s) + L_{lead}\{s1_{SR}(s) - i_{SR}(t=0)\}]$$

Here, since the current $i_{SR}$ is zero at t=0, $i_{SR}(t=0)=0$. Further, since, at t=0, the switch element SWb is turned on, thereby the phase adjustment capacitor C being short-circuited, Vc(t=0)=0. Therefore, "Math 2" can be expressed by the following expression "Math 3".

$$Vc(s) = \frac{Ns}{Np}R_{ds\_on} \cdot 1_{SR}(s)\frac{1 + \frac{sL_{lead}}{R_{ds\_on}}}{1 + sRC} \quad [\text{Math 3}]$$

Therefore, if the RC is set at $RC = L_{lead}/R_{ds\_on}$, as can be seen from the following expression "Math 4", the voltage Vc across the phase adjustment capacitor C can be obtained as a value as a result of amplification of the voltage waveform analogous to the current $i_{SR}$ using the wiring ratio (Ns/Np) of the transformer Tr.

$$Vc(s) = \frac{Ns}{Np}R_{ds\_on} \cdot 1_{SR}(s) \quad [\text{Math 4}]$$

Taking the inverse Laplace transform, we have:

$$Vc(t) = \frac{Ns}{Np}R_{ds\_on} \cdot i_{SR}(t) = \frac{Ns}{Np}V_{ds\_on}(t)$$

Figure 5:
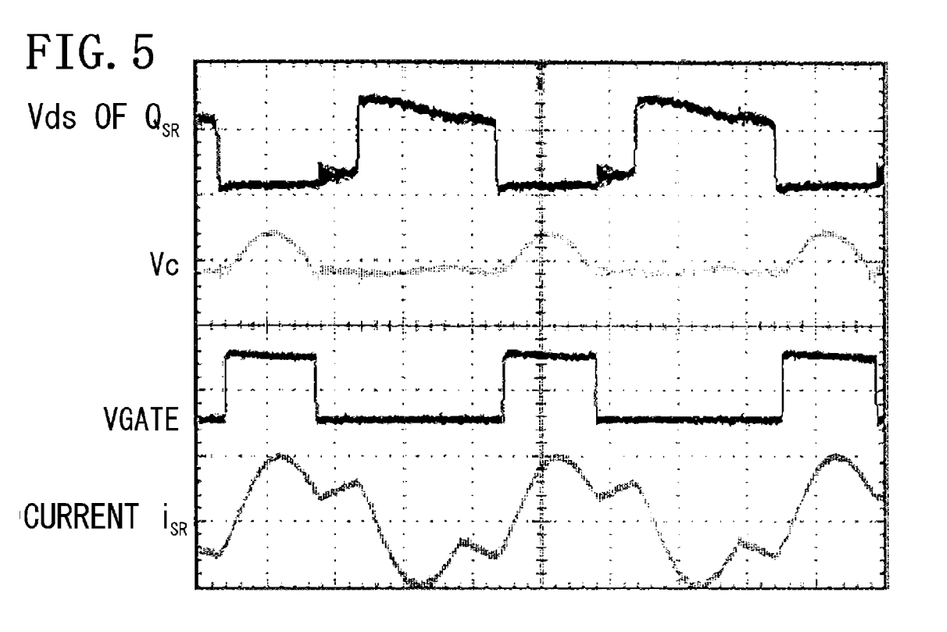
FIG. 5 is an operation waveform diagram for the serial resonance converter shown in FIG. 1.

In FIG. 5, there is shown operation waveforms of a serial resonance converter having a synchronous rectifier circuit of the present embodiment. With reference to FIG. 5, it can be confirmed that, in the period during which the synchronous rectification element $Q_{SR}1$, $Q_{SR}2$ is in the on state, the gate signal (VGATE) being outputted, the current $i_{SR}$ and the voltage Vc across the phase adjustment capacitor C are analogous to each other.

Figure 6A:
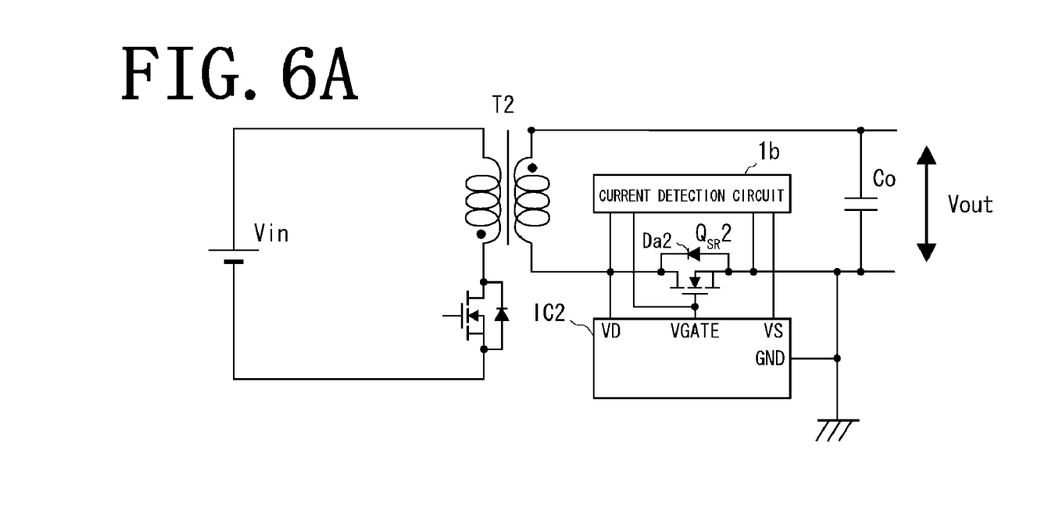
FIG. 6(A) and FIG. 6(B) are circuit configuration diagrams illustrating the circuit configurations of other converters including the embodiment of the synchronous rectifier circuit in accordance with the present invention.
Figure 6B:
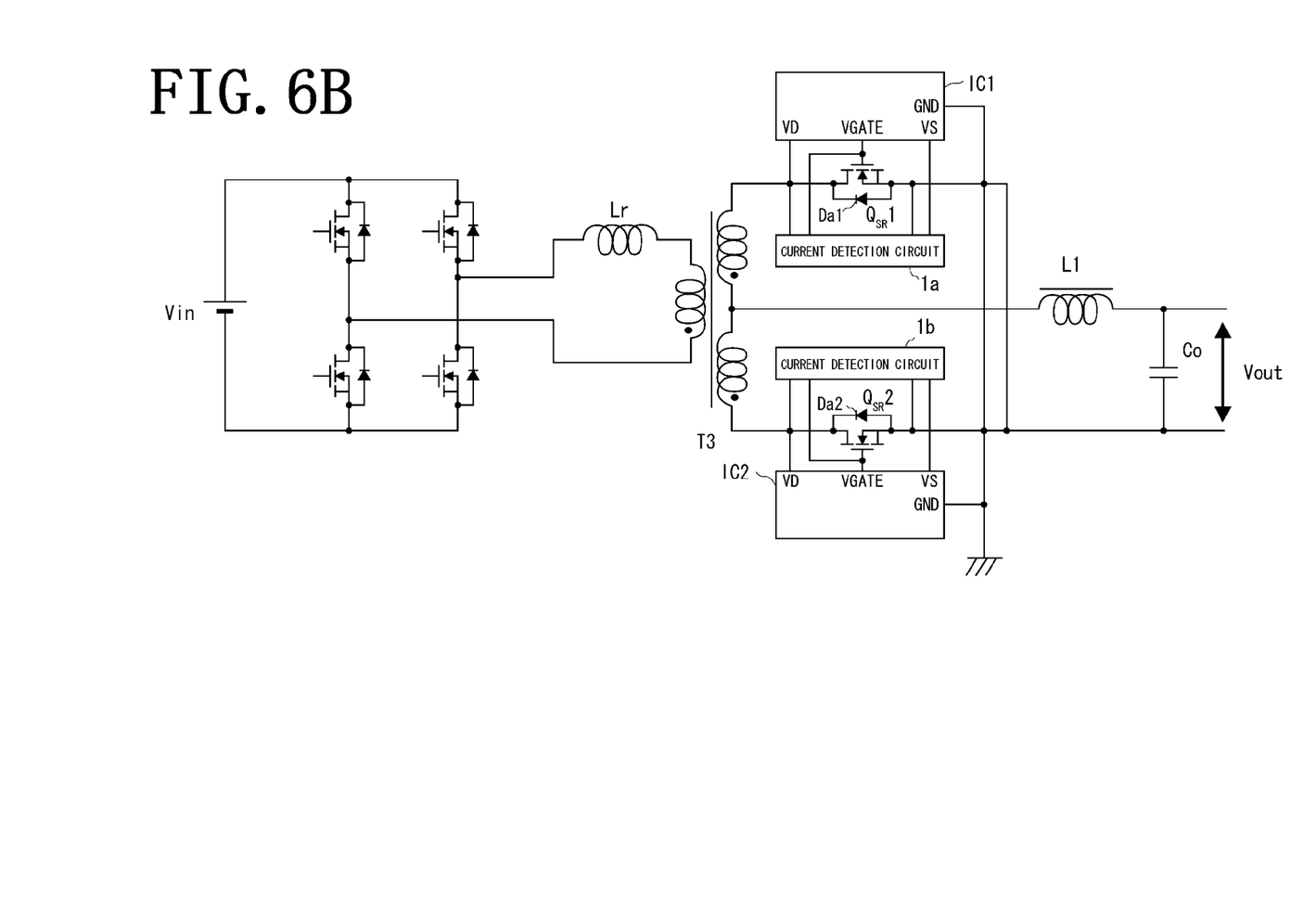

Hereinabove, an example in which the synchronous rectifier circuit of the present embodiment is applied to a serial resonance converter has been explained, however, the synchronous rectifier circuit of the present embodiment may be applied to a flyback converter (refer to FIG. 6(A)), a forward converter (refer to FIG. 6(B)), and the like, in a discontinuous mode, provided that, in the converter, the current $i_{SR}$ flowing through the synchronous rectification element $Q_{SR}1$, $Q_{SR}2$ starts at zero and terminates at zero. It is known that the secondary side switching current in the flyback converter shown in FIG. 6(A) starts at zero due to the effect of the leakage inductance of the transformer T2. Also, in the forward converter, called a phase shift converter, shown in FIG. 6(B), the current $i_{SR}$ flowing through the synchronous rectification element $Q_{SR}1$, $Q_{SR}2$ on the secondary side of the transformer T3 starts at zero and terminates at zero.

The present embodiment is configured such that, in the current detection circuit 1a, 1b, the series circuit of the resistor R1 and the capacitor C1 performs phase adjustment, however, the resistor R1 is not always required, and the present embodiment may be configured such that the capacitor C1 and the secondary winding resistor Rr for the current transformer CT are used to make a phase adjustment.

As described above, the present embodiment is a synchronous rectifier circuit having a synchronous rectification element $Q_{SR}1$, $Q_{SR}2$ and a synchronous rectification control circuit IC1, IC2 for turning on/off the synchronous rectification element $Q_{SR}1$, $Q_{SR}2$ according to the current $i_{SR}$ flowing through the synchronous rectification element $Q_{SR}1$ $Q_{SR}2$, including a current detection circuit 1a, 1b for detecting the current $i_{SR}$ flowing through the synchronous rectification element $Q_{SR}1$ $Q_{SR}2$ during an on-period of the synchronous rectification element $Q_{SR}1$ $Q_{SR}2$ as a synchronized voltage waveform, the synchronous rectification control circuit IC1, IC2 being configured so as to turn off the synchronous rectification element $Q_{SR}1$, $Q_{SR}2$ on the basis of the voltage waveform detected by the current detection circuit 1a, 1b. With this configuration, even if the inductance component $L_{lead}$ is actualized to provide an advanced phase impedance, a sufficient gate width can be ensured, and even if a synchronous rectification element $Q_{SR}1$, $Q_{SR}2$ having a low on-resistance is used, a precise synchronous rectifying operation can be performed, being not influenced by the inductance component.

Further, in accordance with the present embodiment, the synchronous rectification control circuit IC1, IC2 is configured such that it turns on the synchronous rectification element $Q_{SR}1$, $Q_{SR}2$ according to the saturation voltage $V_{Zds\_on}$ of the synchronous rectification element $Q_{SR}1$, $Q_{SR}2$, while turning off the synchronous rectification element $Q_{SR}1$, $Q_{SR}2$ according to the saturation voltage $V_{Zds\_on}$ and the voltage waveform Vc detected by the current detection circuit 1a, 1b, in other words, according to the differential voltage Vdet between the drain voltage $V_{Zds\_on}$ of the synchronous rectification element $Q_{SR}1$ and the voltage Vc across the phase adjustment capacitor C.

Further, according to the present embodiment, the current detection circuit 1a, 1b includes a transformer Tr having a primary side wiring Np connected in parallel with the synchronous rectification element $Q_{SR}1$, $Q_{SR}2$, and a phase adjustment capacitor C connected across the secondary side wiring Ns of the trans former Tr, the phase adjustment capacitor C phase-adjusting the voltage Vc across the phase adjustment capacitor C to be in phase with the current $i_{SR}$ flowing through the synchronous rectification element $Q_{SR}1$, $Q_{SR}2$. With this configuration, the current detection circuit 1a, 1b can detect the voltage Vc across the phase adjustment capacitor C as a voltage waveform synchronized with the current $i_{SR}$ flowing through the synchronous rectification element $Q_{SR}1$ $Q_{SR}2$.

Further, according to the present embodiment, across the secondary side wiring Ns of the trans former Tr, the series circuit of the phase adjustment resistor R and the phase adjustment capacitor C is connected. With this configuration, a phase adjustment capacitor C having a small capacitance can be used, whereby the cost can be reduced.

Further, according to the present embodiment, assuming that the resistance value of the phase adjustment resistor R is R; the capacitance of the phase adjustment capacitor C is C; the on-resistance of the synchronous rectification element $Q_{SR}1$, $Q_{SR}2$ is $R_{ds\_on}$; and the inductance component of the synchronous rectification element $Q_{SR}1$, $Q_{SR}2$ is $L_{lead}$, respectively, the phase adjustment resistor R and the phase adjustment capacitor C are set to satisfy a relation of $RC=L_{lead}/R_{ds\_on}$. With this configuration, the phase adjustment resistor R and the phase adjustment capacitor C constituting the series circuit for phase adjustment can be simply selected according to the characteristics of the synchronous rectification element $Q_{SR}1$, $Q_{SR}2$.

Further, according to the present embodiment, the current detection circuit $1a$, $1b$ includes a first switch element SWa connected across the synchronous rectification element $Q_{SR}1$, $Q_{SR}2$ and the primary side wiring Np, and turned on/off in synchronization with the synchronous rectification element $Q_{SR}1$, $Q_{SR}2$.

Further, according to the present embodiment, the current detection circuit $1a$, $1b$ includes a switch element SWb connected in parallel with the phase adjustment capacitor C for resetting the phase adjustment capacitor C, upon the synchronous rectification element $Q_{SR}1$, $Q_{SR}2$ being turned off.

Hereinabove, the present invention has been explained with a specific embodiment, however, the above embodiment is an example, and needless to say, it may be modified within the scope of the spirit of the present invention for implementation.

What is claimed is:

1. A synchronous rectifier circuit having a synchronous rectification element, and a synchronous rectification control circuit for turning on/off said synchronous rectification element according to the current flowing through the synchronous rectification element, the synchronous rectifier circuit, comprising:
a current detection circuit, having a transformer, the transformer having a primary side wiring connected in parallel with said synchronous rectification element and a secondary side wiring connected across a phase adjustment capacitor phase-adjusting the voltage across said phase adjustment capacitor to be in phase with the current flowing through said synchronous rectification element, for detecting the current flowing through said synchronous rectification element as a synchronized voltage waveform, wherein
when the differential voltage between the saturation voltage of said synchronous rectification element and the voltage detected by said current detection circuit decreases to the turn-on threshold voltage during an off-period of said synchronous rectification element, said synchronous rectification control circuit turns on said synchronous rectification element, and
when said differential voltage increases to the turn-off threshold voltage during an on- period of said synchronous rectification element, said synchronous rectification control circuit turns off said synchronous rectification element.

2. The synchronous rectifier circuit according to claim 1, wherein the series circuit of the phase adjustment resistor and said phase adjustment capacitor is connected across the secondary side wiring of said transformer.

3. The synchronous rectifier circuit according to claim 2, wherein, assuming that the resistance value of said phase adjustment resistor is R; the capacitance of said phase adjustment capacitor is C; the on-resistance of said synchronous rectification element is $R_{ds-on}$;
and the inductance component of said synchronous rectification element is $L_{lead}$, respectively, said phase adjustment resistor and said phase adjustment capacitor is set to satisfy a relation of $RC=L_{lead}/R_{ds\_on}$.

4. The synchronous rectifier circuit according to claim, wherein said current detection circuit includes a first switch element connected across said synchronous rectification element and said primary side wiring, and turned on/off in synchronization with said synchronous rectification element.

5. The synchronous rectifier circuit according to claim 2, wherein said current detection circuit includes a first switch element connected across said synchronous rectification element and said primary side wiring, and turned on/off in synchronization with said synchronous rectification element.

6. The synchronous rectifier circuit according to claim 3, wherein said current detection circuit includes a first switch element connected across said synchronous rectification element and said primary side wiring, and turned on/off in synchronization with said synchronous rectification element.

* * * * *